Nov. 24, 1959 G. H. BARRY 2,914,674

PHASE-PULSE RECEIVER SYNCHRONIZATION MEANS

Filed Sept. 23, 1958 3 Sheets-Sheet 1

INVENTOR.
GEORGE H. BARRY
BY Moody and Goldman
ATTORNEYS

Nov. 24, 1959 G. H. BARRY 2,914,674

PHASE-PULSE RECEIVER SYNCHRONIZATION MEANS

Filed Sept. 23, 1958 3 Sheets-Sheet 2

INVENTOR.
GEORGE H. BARRY
BY Moody and Goldman
ATTORNEYS

Nov. 24, 1959 G. H. BARRY 2,914,674

PHASE-PULSE RECEIVER SYNCHRONIZATION MEANS

Filed Sept. 23, 1958 3 Sheets-Sheet 3

INVENTOR.
GEORGE H. BARRY

BY Moody and Goldman

ATTORNEYS

United States Patent Office 2,914,674

Patented Nov. 24, 1959

2,914,674

PHASE-PULSE RECEIVER SYNCHRONIZATION MEANS

George H. Barry, North Hollywood, Calif., assignor to Collins Radio Company, Cedar Rapids, Iowa, a corporation of Iowa Application September 23, 1958, Serial No. 762,801

6 Claims. (Cl. 250—27)

Figure 1:
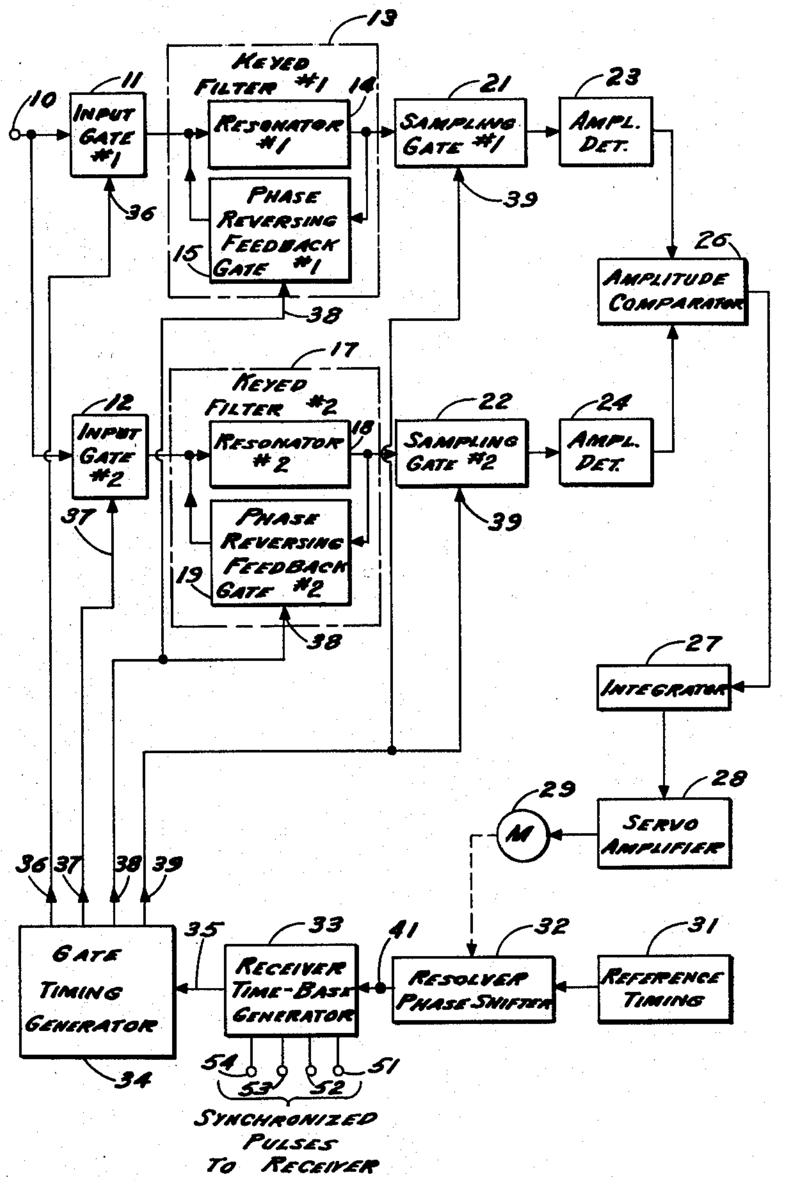

This invention relates to means for synchronizing phase-pulse receivers without requiring the transmission of any special synchronizing signal.

This invention is concerned with receiver synchronization in a particular type of communication system described in U.S. patent application No. 502,045 to M. L. Doelz and D. F. Babcock, filed April 18, 1955, and assigned to the same assignee as the present invention. Briefly, such a communication system transmits a plurality of multiplexed tones which are frequency spaced by intervals of $n/T$ where $n$ is an integer other than zero. Each tone is discretely phase-modulated at synchronous intervals of duration T. The phase-modulation transitions for all tones occur simultaneously at the beginning of each time interval T. The modulation of a given tone is contained in the amount of its phase-shift between adjacent intervals T. Such type of modulation may be called phase-pulse modulation, wherein the pulse period is interval T. Each modulated tone can carry two independent channels of binary information simultaneously by providing four discrete phase-shifts between time-adjacent pulses. Due to the chosen relationship between tone-frequency intervals $n/T$ and the synchronous-timing interval T, the sidebands of the modulated tones are permitted a large amount of overlap in the same frequency-space without mutual interference, thereby permitting a large saving of spectrum.

Ideal detection of such phase-pulse-modulated signal requires a detector that is operated synchronously with the received signals. That is, the detector must operate with a particular timed relationship with each interval T of the received signal. In the past, it has been found preferable to obtain detector synchronization by transmitting a separate tone which is gated off and on at alternate intervals T. The synchronizing tone had to be frequency-spaced away from the modulated tones to prevent interference. Consequently, additional spectrum was needed for the transmission of this tone; and it required a proportional amount of transmitter power, and additional transmitter equipment. The synchronizing tone was selectively detected at the receiver to synchronize it.

It is therefore an object of this invention to eliminate the need for a transmitted-synchronizing tone in a phase-pulse communication system.

It is another object of this invention to enable more efficient use of transmitter power by allowing it to be applied entirely to message-modulated signals.

It is a further object of this invention to permit a decrease in the transmitted spectrum for phase-pulse communication systems by eliminating a separate synchronization signal.

It is still another object of this invention to simplify transmitter construction in a phase-pulse communication system by eliminating synchronization-tone generating apparatus at the transmitter.

It is a further object of this invention to provide a synchronization system at a phase-pulse receiver which can synchronize its detector directly from a received message-modulated signal.

It is a still further object of this invention to improve phase-pulse receiver synchronization caused by delay distortion of a synchronization tone in wire connected systems.

This invention utilizes a pair of keyed filters which are enabled periodically for equal amounts of time that partially overlap. A keyed filter is described in U.S. patent application No. 698,994, filed December 28, 1955, by Melvin L. Doelz and assigned to the same assignee as the present application. The keyed filters in the invention are tuned to a frequency outside of an ensemble of received modulated tone frequencies. A respective integration of the received frequencies is done in the filters during each periodic enablement. The amplitude of the output of each filter is sampled after each periodic enablement. The relative magnitudes of the samplings of the two filters are dependent upon the phasing between the periodic enablement and the pulsing of the received tones. The magnitudes of the outputs from the two keyed filters are subtracted; and their difference provides a polarity sense which controls the direction of movement of a servo means that maintains a locally-derived enabling frequency in synchronism with the phase-pulses of the received signals.

Figure 2:
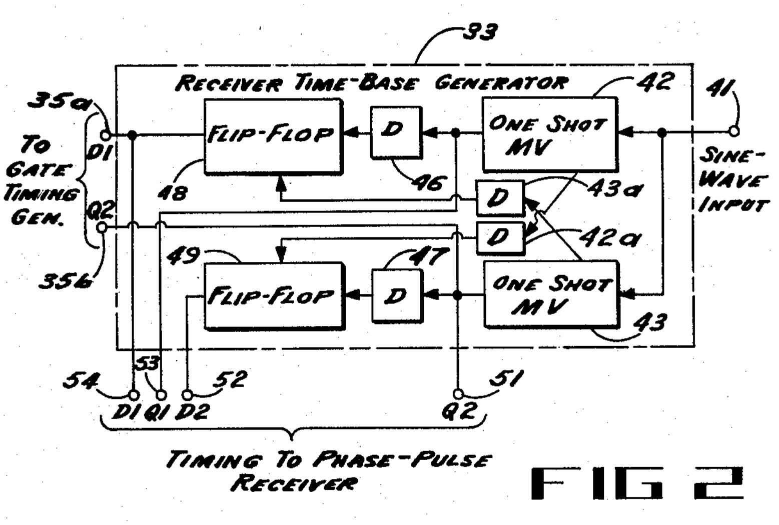
Figure 3:
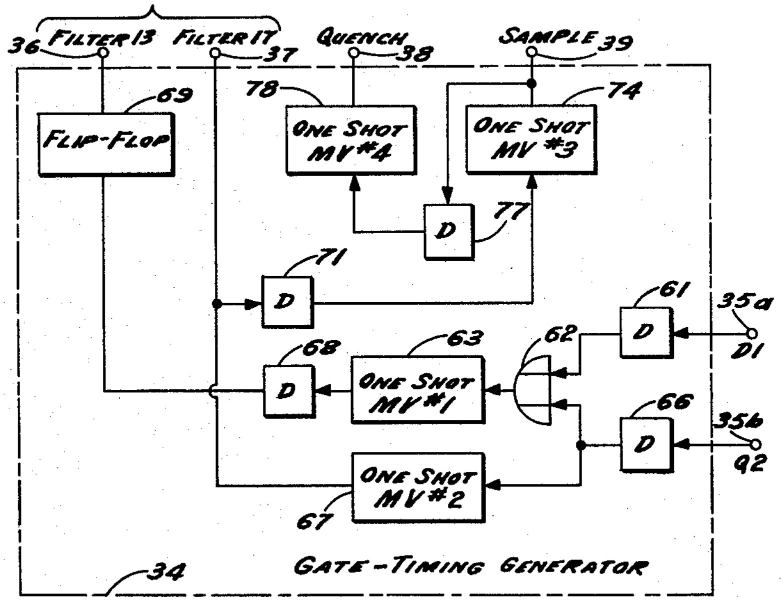

Further objects, features and advantages of this invention will be apparent to one skilled in the art upon further study of the specification and accompanying drawings, in which:

Figure 1 is a block diagram of the invention;

Figures 2 and 3 give detailed forms for block components shown in Figure 1; and

Figure 4:
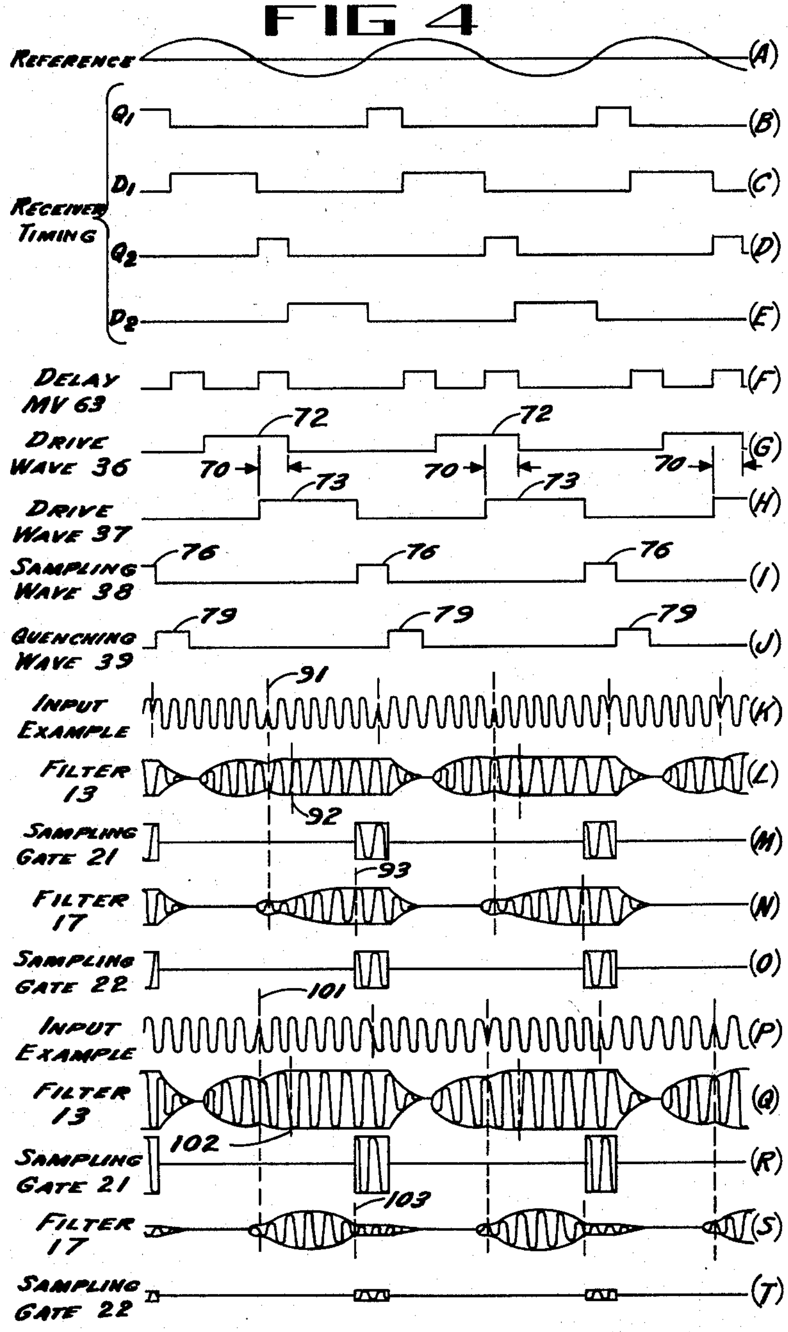

Figures 4(A) through (T) show waveforms used in explaining the invention.

The invention is now considered in more detail by reference to a specific embodiment. In Figure 1, an input terminal 10 receives a phase-pulsed signal, which consists of an ensemble of tones $f_1$ through $f_n$ that have an incremental frequency spacing of $n/T$; where $n$ is an integer, and T is the pulse duration of the received tones. Each phase-pulse of a tone is initiated by a discrete modulated phase-shift. Hence, the modulation carried by any tone is obtained by phase comparisons between adjacent pulses of the given tone, as explained in patent application No. 502,045, cited above. The pulse transitions occur at the same time for all tones. However, independent information is carried by the tones; and any one tone may carry simultaneously one or more independent channels of information. Figures 4(K) and (P) illustrate examples of phase-pulsed waves.

A pair of input gates 11 and 12 each have an input connected to terminal 10 to receive the ensemble of modulated tones. Gates 11 and 12 also respectively receive inputs 36 and 37 from a timing generator 34 which periodically enables the gates at different times with an overlap of their enablement periods. An example of the enablement timings of gates 11 and 12 is shown in Figures 4(G) and (H). Gate 11 is enabled during pulses 72 in Figure 4(G), and gate 12 is enabled during pulses 73 in Figure 4(H). An overlap of about one-quarter of a phase-pulse period is shown between these two waves. The overlap may be between zero and one-half of a phase-pulse period. However, under the circumstances described herein an optimum overlap would be approximately one-quarter of a phase-pulse period, excluding initial transient time, if the filters are tuned to a frequency that is displaced from the nearest ensemble tone frequency by $1/T$.

A pair of keyed filters 13 and 17 are respectively connected to the outputs of gates 11 and 12. Each keyed filter is tuned to a frequency $f_0$ which is spaced by a frequency interval $k/T$ from any given tone in the ensemble of received tones; where $k$ is a spacing factor and T is the pulse period of the received tones. In this embodiment $k$ is taken as one. The tuned frequency of keyed resonators 13 and 17 may be either above or below the ensemble of modulator tones, since it is frequency spacing (and not absolute frequency) which is controlling.

Resonators 13 and 17 may be constructed as taught in Patent No. 2,825,808, titled "Keyed Filters," issued March 4, 1958, to Melvin L. Doelz and assigned to the Collins Radio Company. Basically, each of the keyed filters includes a stable resonator 14 or 18 which is tuned to frequency $f_0$. A phase-reversing feedback gate 15 or 19 connects the output of each resonator to its input. The feedback gates control the phase of the feedback which is either positive or negative as controlled by an input 38. Normally, positive feedback is provided; and it is adjusted to a value which very nearly overcomes all losses in the respective resonator to provide it with an exceedingly high Q, but however is insufficient to cause the resonator to burst into self-sustaining oscillation. Feedback-gate inputs 38 are connected to a single output of timing generator 34. When inputs 38 are enabled by quenching pulses 79, shown in Figure 4(J), a 180° phase reversal is provided to the feedback energy, and hence negative feedback is caused. Such negative feedback quickly quenches or damps any existing oscillation within the resonators.

A pair of sampling gates 21 and 22 are respectively connected to the outputs of resonators 14 and 18. Gates 21 and 22 are normally disabled but are simultaneously enabled during pulses 76 in Figure 4(I). The sampling gate enablement occurs after each pair of driving pulses 72 and 73 and before the next quenching pulse 79.

A pair of amplitude detectors 23 and 24 are respectively connected to the outputs of sampling gates 21 and 22 to detect pulses having equal durations and having amplitudes proportional to the sampled outputs from gates 21 and 22.

An amplitude comparator 26 is connected to the outputs of detectors 23 and 24 and provides an output pulse proportional to the difference between the magnitudes of simultaneous pulses from detectors 23 and 24.

Integrator 27 is connected to the output of comparator 26 and provides an output proportional to the average value of the comparator output pulses. Thus, the integrator provides an error-output signal which has zero value when the amplitudes of the detected pulses are equal. The polarity of pulses from comparator 26 is dependent upon which detector 23 or 24 is providing the larger amplitude sampling pulses. The integrator output thus maintains polarity sense.

A servo motor 29 is driven by a servo amplifier 28 that is connected to the output of integrator 27. Hence, motor 29 will revolve in one direction when pulses from detector 23 have greater amplitude than pulses from detector 24, and vice versa.

Motor 29 controls the setting of a phase-shifter 32 which may be of the well-known resolver type; which "remembers" its phase setting when motor 29 is not energized.

A stable-reference frequency is provided by a reference-frequency source 31, which has its output connected to phase-shifter 32. Timing source 31 may be the direct output of a stable-oscillator or its multiple or submultiple frequency. The phase-shift interposed by resolver 32 controls the synchronization of the pulses provided from generator 33 with respect to the signal received at input terminal 10.

A receiver time-base generator 33 converts the sine-wave form received from phase-shifter 32 into a plurality of pulsed waves which are used in the detection process of a phase-pulse receiver (not shown). This invention regulates the timing of these pulsed waves so that they maintain a required synchronism with the time-boundaries of the phase-pulses being received at input terminal 10.

In regard to the general system of Figure 1, output 35 of generator 33 is a pulsed wave converted from the sine-wave at input 41 and is all that is required for an understanding of the operation of the invention. A particular form of generator 33 is illustrated in Figure 2, which will be described in more detail below to show a way of generating pulsed wave 35.

Gate-timing generator 34 receives pulsed output 35 from time-base generator 33, and operates the gates shown in Figure 1. Gate generator 34 provides pulse-wave outputs 36, 37, 38 and 39, which enable (and disable) the gates in the invention in the proper sequence and durations. Output waves 36, 37, 38 and 39 are generated in synchronism with input 35 and are shown in Figures 4(G) through 4(J). A particular form of timing generator 34 is shown in Figure 3, which will also be discussed in more detail below.

Input gates 11 and 12 have their enablement controlled by outputs 36 and 37 respectively of generator 34. Figures 4(G) and 4(H) respectively illustrate outputs 36 and 37. Thus, gate 11 is enabled during pulses 72, and gate 12 is enabled during pulses 73.

Keyed filters 13 and 17 receive the input wave from terminal 10 during the enablement periods of pulses 72 and 73, respectively. Thus, both keyed filters are receiving input energy simultaneously only during the overlap period 70 of pulses 72 and 73.

There is a disabled period during which neither keyed filter 13 nor 17 is receiving any input signal from terminal 10, and this period commences at the trailing edge of a pulse 73. During the disabled period, the resonators of the keyed filters continue to ring with the amplitude and phase existing in the resonator at the instant that the input signal to the keyed filter was discontinued by the end of an enabling pulse 72 or 73.

The ringing amplitude of the energy remaining in the resonators during the disabled period is called herein the "stored amplitude"; and it is the quantity used by this invention to control synchronization. This stored amplitude is sampled by gates 21 and 22 by enabling them during the periods of pulses 76 shown in Figure 4(I). Pulses 76 occur at the beginning of the disablement period and simultaneously for both keyed filters. Thus, the stored ringing energy in each keyed filter is viewed through its respective sampling gate 21 or 22 and is amplitude detected by a respective detector 23 or 24. Due to the very high Q of resonators 14 and 18, there is no significant change of amplitude of the stored signal during the stored period.

Immediately following a sampling pulse 76, the keyed filters have their stored energies quenched (dissipated). Quenching is thus done during the disabled period of the keyed-filter inputs and is controlled by pulses 79, shown in Figure 4(J), which immediately follow the sampling pulses. By the end of each quenching pulse 79, there is no significant ringing in either resonator 14 or 18. The resonators are then ready to be keyed by the input signal when enabled by the next respective drive pulses 72 and 73.

As stated above, resonators 14 and 18 are not tuned to any received tone frequency but instead are tuned to a frequency $f_0$, which is either above the highest or below the lowest tone frequency of a received ensemble of modulated tones. The frequency spacing of tuned frequency $f_0$ from the nearest tone frequency is dependent upon the pulse periods of the received tones. If the modulated pulse period is T, the spacing between any two adjacent frequencies in a tone ensemble is $n/T$, where $n$ is an integer. Frequency $f_0$ is spaced from the nearest ensemble frequency by $k/T$, where $k$ is an integer which may be the same as $n$ but need not be. The invention has the greatest pull-in phase range when $k$ is one. In examples of this invention given herein it is assumed that $k$ is one.

With a $k$ of one, the nearest ensemble tone, if unmodulated, will drive the filter resonance to a maximum value at the mid-period of the driving pulse 72 or 73, and the resonance will decrease back to zero level at the end of the driving pulse. If $k$ is greater than one, the filter resonance will build up to a maximum and decrease to zero a number of times equal to $k$, but it will be zero at the end of a pulse 72 or 73.

However, if a modulating phase transition occurs during an enablement period 72 or 73, the stored amplitude is affected by both the amount of the phase shift and the time of its occurrence relative to the start of the respective pulse period. Since enablement pulses 72 and 73 are staggered, the same signal phase-shift occurs in the different filters at different times related to the beginning of their respective enablement pulses. Thus in general, a phase-shift during the enablement periods will cause unequal storage amplitudes.

However, a particular condition used by this invention is obtained when the signal phase-shift occurs midway during each overlap period 70 seen in Figures 4(G) and (H). That is, equality of stored amplitude is obtained when the time of signal phase-shift is spaced from the trailing edge of a pulse 72 by the same amount that it is spaced from the leading edge of a corresponding pulse 73.

If the phase-shifts occur during overlap periods 70, but do not occur midway during these periods, the stored amplitudes will be unequal. That is, if the phase-shift occurs closer to the leading edge of pulses 73 than to the trailing edge of pulses 72, the stored amplitude in filter 13 will increase and the stored amplitude in filter 17 will decrease. On the other hand, if the phase-shift occurs closer to the trailing edge of pulses 72 than to the leading edge of pulses 73, an opposite change in stored amplitude will occur, i.e. that in filter 17 will be greater than the stored amplitude in filter 13.

Figure 4(K) illustrates an example of a received tone, which may be the closest one in a received ensemble. Figures 4(L) through 4(O) show the consequences of having the signal phase-shifts occur midway during overlap periods 70. Figure 4(L) illustrates the amplitude variation of the ringing by keyed filter 13. The dart shaped amplitude variations begin with an enablement pulse 72. Filter 13 has its envelope amplitude build up to a maximum value which occurs midway of pulse 72, due to the fact that the resonator is detuned from the incoming tone frequency by $1/T$. Then, the amplitude begins to decrease, and it would decrease to a value of zero at the end of pulse 72 except for the fact that a modulating phase-shift occurs at instant 91. Because of the phase-shift, a departure in the envelope amplitude variation occurs, which appears as a change in slope at instant 91. At instant 92 which marks the end of pulse 72, no further input energy is received by the filter. Consequently, it continues to ring with the same amplitude that existed in the resonator at the instant that the input energy ceased being applied, and this is the "stored amplitude." Thus, when sampling gate 21 is enabled shortly thereafter by a pulse 76, a sampled output is provided from gate 21 as shown in Figure 4(M). This output will be proportional to the stored amplitude of filter 13. Immediately following the termination of sampling pulse 76, a quenching pulse 79 is provided to feedback gate 15 to quickly damp out the vibration within filter 13, as is illustrated by the tapered ends of the dart shaped envelopes.

Figure 4(N) illustrates the corresponding operation of keyed filter 17. It is noted here that a phase-shift occurs shortly after the beginning of an enablement pulse 73 to cause a wiggle near the beginning of each dart envelope. Nevertheless, due to the mid-timing of the phase-shift, the stored amplitude in filter 17 is equal to that in filter 13. Sampling gate 22 is enabled immediately following the end of pulse 73, and it passes an output shown in Figure 4(O), which has the same amplitude as the output pulses from gate 21 illustrated in Figure 4(M). Thus, amplitude detectors 23 and 24 detect equal pulses.

Amplitude comparator 26 obtains the difference between the amplitudes of the pulses from detectors 23 and 24, and the difference will be zero in the example of Figures 4(K)–(O) since the detected pulses have equal amplitude. Consequently, zero error signal is provided to integrator 21, and motor 29 is not actuated. Accordingly, resolver phase-shifter 32 retains its setting, and the synchronized condition of the system is maintained.

Suppose however that the modulation phase-shifts do not occur midway during each overlap period 70. Figures 4(P)–(T) give such an example. In this case, it is presumed that an input tone wave has the timing illustrated in Figure 4(P), with phase-shifts occurring at instances 101. Figure 4(Q) illustrates the corresponding ringing envelope variation for filter 13; while Figure 4(S) shows the envelope variation for filter 17. After the signal input of filter 13 by a pulse 72, its resonance builds up until the phase-shift occurs, causing a change in slope in its envelope; and then the build up continues to a final value, which exists at instant 102 at the end of pulse 72. Thereafter, the stored amplitude is sampled to provide the waves illustrated in Figure 4(R). After damping, a repeated cycle is obtained by keyed filter 13, except for any change caused by action of the servo system on resolver phase-shifter 32, which is neglected at this time. In a corresponding manner, filter 17 begins building up at the initiation of pulse 73. Almost immediately a phase-shift at an instant 101 distorts its envelope, and it terminates at an instant 103 to leave a stored amplitude, which is sampled by gate 22 to provide the pulsed waves shown in Figure 4(T).

It is noted that the amplitudes of the sampled waves in Figures 4(R) and (T) are significantly different. After detection in detectors 23 and 24, their difference is sensed by comparator 26. The polarity at the output of comparator 26 indicates which detector provides the larger pulse. For example, a positive-polarity comparator output can signify that detector 23 provided a larger amplitude pulse than detector 24; and a negative-comparator output thus signifies that detector 24 provides a larger pulse than detector 23. The polarity sense controls the direction of rotation of motor 29 and hence the direction of phase-shift by resolver 32. This direction of phase-shift is always in the direction which obtains equality of pulse amplitudes from detectors 23 and 24, i.e. a null from comparator 26. Such equality is obtained by adjusting the phase of pulses 72 and 73 until their overlap 70 is centered with the phase-shifts of the incoming signal.

Accordingly, the system synchronizes the timing of its generators 33 and 34 to an incoming signal, or ensemble of signals. The length of time required for synchronization is dependent upon several factors such as the length of resonator drive interval T, the electrical time constant of integrator 27 and the mechanical time constant of motor 29, resolver 32, and any gear transmission (not shown) which might be used with them. However, phase-shifters not having any mechanical elements can be used which enable much shorter time constants.

The largest phase pull-in range of the invention is when $k=1$, i.e. $f_0$ is spaced from the nearest modulated tone of an ensemble by a frequency interval $1/T$. For other cases there exists the possibility of an undesired stable null in the output of comparator 26. For this reason, when various tones of an ensemble are not used some of the time, it is preferable to position $f_0$ next to a tone bounding the ensemble that will be used all the time, perhaps to have other tones consecutively placed from it in the order of their time of use.

Now referring to the version of time-base generator 33 shown in Figure 2, the phase-shifted sine-wave from resolver 32 is provided to a terminal 41. Such a sine-wave is represented in Figure 4(A). In Figure 2, a pair of one-shot multivibrators 42 and 43 have inputs connected to terminal 41. Multivibrator 42 is triggered by the positive-going axis-crossings of the input sine wave; while multivibrator 43 is triggered by its negative-going axis-crossings. Equal pulse durations are provided by both one-shot multivibrators 42 and 43, but the timing of their output waves is interleaved. For example, Figure 4(B) illustrates the output pulse Q1 provided at terminal 53 of multivibrator 42; and Figure 4(D) illustrates the output pulses Q2 provided at terminal 51 of multivibrator 43.

A pair of bistable multivibrators 48 and 49 are respectively connected through differentiation circuits 46 and 47 to the outputs of multivibrators 42 and 43. Bistable multivibrators 48 and 49 are triggered by pulses received from their respective differentiating circuits generated by the trailing edge of pulses from the respective multivibrators 42 and 43. Bistable circuits 48 and 49 are also reset by pulses received from differentiating circuits 42*a* and 43*a* generated by the leading edges of the pulses from multivibrators 42 and 43. Figure 4(C) illustrates wave D1 provided at terminal 54; while Figure 4(E) illustrates wave D2 provided at terminal 52. Furthermore, a pair of terminals 35*a* and 35*b* are provided which are also connected respectively to the outputs of multivibrators 48 and 49 to provide waves D1 and Q2 to gate-timing generator 34.

Figure 3 illustrates a detailed form for gate-timing generator 34, which provides an overlap equal to the duration of each pulse Q2 in Figure 4(D). Generator 34 has input terminals 35*a* and 35*b* that correspond to those terminals in Figure 2 of time-base generator 33. A pair of differentiating circuits 61 and 62 in Figure 3 are respectively connected to terminals 35*a* and 35*b*. An "or" gate 62 has a pair of inputs respectively connected to the outputs of differentiating circuits 61 and 66. A one-shot multivibrator 63 is triggered by the leading edges of the pulses of waves D1 and Q2 provided from differentiating circuits 61 and 66. Figure 4(F) illustrates the pulsed output from multivibrator 63.

A flip-flop trigger circuit 69 is connected through a differentiating circuit 68 to the output of multivibrator 63. Flip-flop 69 is triggered by the trailing edges of the pulses from multivibrator 63 to provide a delayed wave at terminal 36, which is illustrated in Figure 4(G) used to enable the input to filter 13.

Another one-shot multivibrator 67 has its input connected to the output of differentiating circuit 66. The output of multivibrator 67 is connected to terminal 37 to provide the wave illustrated in Figure 4(H) used to enable the input to filter 17. The duration of the pulses from one-shot multivibrator 67 is made equal to that of the pulses from flip-flop 69. Thus, the drive waves provided at output terminals 36 and 37 have equal duration but are staggered, i.e. pulses 72 and 73. The overlap period 70 is determined by and is equal to the period of a pulse from multivibrator 63 shown in Figure 4(F).

A one-shot multivibrator 74 has an input connected through a differentiating circuit 71 to the output of multivibrator 67. Multivibrator 74 is triggered by the trailing edge of pulses 73 provided from multivibrator 67. Figure 4(I) illustrates sampling pulses 76 provided from multivibrator 74 at terminal 39.

Another one-shot multivibrator is connected through another differentiating circuit 77 to the output of multivibrator 74. One-shot multivibrator 78 is triggered by the trailing edges of pulses 76 provided from one-shot multivibrator 74. One-shot multivibrator 78 provides quenching pulses 79 shown in Figure 4(J) at terminal 38.

Although this invention has been described with respect to a particular embodiment thereof, it is not to be so limited as changes and modifications may be made therein which are within the full intended scope of the invention as defined by the appended claims.

I claim:

1. Means for synchronizing time-base pulses with a received phase-pulsed signal, comprising a source of reference-frequency, phase-shifting means connected to said source to phase-shift said reference-frequency, means for generating said time-base pulses from an output of said phase-shifting means, gate-timing means coupled to said time-base generating means; said gate-timing means generating a pair of driving-pulsed outputs with time-overlapped driving pulses, a sampling-pulsed output, and a quenching-pulsed output; a pair of input gates, each having one input receiving said phase-pulsed signal, another input of each input gate connected to a respective driving-pulsed output, pulses of said sampling and quenching pulsed outputs being provided sequentially during non-overlapped time-intervals of said driving pulses; a pair of keyed filters, each having a signal input and a feedback-gate input, said keyed filters tuned away from the frequency of said signal, the signal input of each keyed filter being connected to a respective output of said input gates, each feedback-gate input being connected to said quenching-pulsed output, a pair of sampling gates, each having an input connected to a respective output of said keyed filters, and each sampling gate having another input connected to said sampling-pulsed output of said gate-timing means, a pair of amplitude detectors respectively connected to outputs of said sampling gates, amplitude-comparing means connected to outputs of said amplitude detectors and providing an output signal proportional to the amplitude difference, integrating means connected to an output of said amplitude-comparing means, and servo means connected between the output of said integrating means and said phase-shifting means to lock the phase of said time-base pulses with phase-pulses of said signal.

2. Means for synchronizing a pulsed-output from a time-base generator with a received phase-pulsed signal, comprising a pair of input gates respectively receiving said phase-pulsed signal; a gate-timing generator providing at least a pair of driving-pulsed outputs, a sampling-pulsed output, and a quenching-pulsed output; said gate-timing generator being connected to the output of said time-base generator, said pair of driving-pulsed outputs having a common period of pulse overlap and a common period of no existing pulse, said input gates each having an enabling input respectively connected to said driving-pulsed output; a pair of keyed filters, each having a signal input and a quenching input, with the signal input of each filter connected to a respective output of one of said input gates, and the quenching input of each keyed filter being connected to the quenching-pulsed output of said timing generator, quenching-pulses occurring prior to the enablement of either of said input gates, sampling pulses occurring after said enablement, a pair of sampling gates respectively connected to outputs of said keyed filters, each sampling gate having an enabling input connected to the sampling-pulsed output of said gate-timing generator, means for amplitude-comparing outputs of said sampling gates, means for smoothing an output of said amplitude comparing means, means providing a reference wave, and regulator means for controlling the phase of the output of said time-base generator.

3. Means for synchronizing a pulse-generating means with a received phase-pulsed signal, comprising first and second input gates, each having a pair of inputs and an output, with one input receiving said phase-pulsed signal, first and second reasonators, each having an input and an output, each resonator having its input connected to a respective output of said input gates, said resonators tuned to a frequency spaced from phase-pulsed signal by an integer multiple of the reciprocal of a pulse period of said signal, first and second phase-reversing feedback gates respectively connecting the outputs of respective resonators to their inputs to normally provide positive feedback, each feedback gate having a phase-reversing input, first and second sampling gates, each having a pair of inputs and an output, with each having one input connected respectively to an output of one of said resonators, amplitude comparing means connected respectively to outputs of said sampling gates, regulating means connected to an output of said comparator, a reference-wave source, phase-shifting means connected between said reference-wave source and said pulse-generating means, said phase-shifting means being connected to said regulating means and having its amount of phase-shift regulated by it; said pulse-generating means providing a pair of outputs with overlapping driving-pulses, a sampling-pulsed output, and a quenching-pulsed output; the other input of each input gate being respectively connected to said driving-pulsed output, the quenching-pulsed output being connected to the other inputs of said feedback gates, and the other inputs to said sampling gates being connected to the sampling-pulsed output of said pulse-generating means.

4. Means for synchronizing the pulses of a time-base generator with an ensemble of received phase-pulsed tones being separated by frequency intervals of $n/T$ where $n$ is a positive integer, and T is the period of a pulse of said tones, comprising a pair of keyed filters being tuned to a frequency $f_0$ spaced from said ensemble by a frequency $k/T$ where $k$ is an integer, each of said keyed filters having a resonator, and a quenching gate connected between an output and an input of said resonator, a pair of drive gates having a pair of inputs, with an output connected to an input of a respective resonator, one input of each of said drive gates receiving said ensemble of tones; a pair of sampling gates, each having a pair of inputs and an output, with one input connected to a respective output of one of said resonators, a pair of amplitude detectors respectively connected to outputs of said sampling gates, an amplitude comparator connected to said amplitude detectors, an integrator connected to the output of said comparator, a servo amplifier connected to said integrator, and a servo motor connected to said servo amplifier, a resolver phase-shifter being regulated by said motor, a reference-timing source being connected to said resolver, and said time-base generator having an input connected to said resolver phase-shifter for generating pulses phase locked with the wave controlled by said phase-shifter, a gate-timing generator having an input connected to said time-base generator, said gate-timing generator providing a pair of overlapping driving-pulsed outputs, the remaining inputs of said input gates respectively connected to said driving-pulsed outputs, said gate-timing generator also providing a quenched-pulsed output connected to each of said quenching gates, and said gate-timing generator also providing a sampling-pulsed output connected to the other inputs of said sampling gates, with the pulses of said sampling and quenching outputs occurring in that order and between pulses of both said driving-pulsed outputs.

5. Synchronizing means as defined in claim 4 in which said time-base generator comprises first and second one-shot multivibrators having inputs connected to said phase shifter, said first one-shot being triggered by positive axis-crossings of said reference wave and said second one-shot being triggered by negative axis-crossings of said reference wave, said first and second one-shot multivibrators providing equal short duration pulses, a pair of differentiating circuits respectively connected to the outputs of said first and second one-shot multivibrators, a pair of flip-flop circuits respectively connected to said pair of differentiating circuits and being triggered by the trailing edges of pulses from said first pair of one-shots, another pair of differentiating circuits respectively connected between opposite ones of said one-shots and flip-flops, the flip-flops being reset by the leading edges of pulses from said one-shots, and outputs of said generator being provided by one of said one-shot multivibrators and one of said flip-flops.

6. Synchronizing means as defined in claim 5 in which said gate-timing generator comprises, a pair of terminals connected respectively to outputs of said time-base generator, first and second differentiating circuits connected to said pair of terminals, an "or" gate having a pair of inputs connected respectively to said first and second differentiating circuits and having an output, a first one-shot multivibrator providing short-duration pulses and having an input connected to the output of said "or" circuit, a third differentiating circuit, a flip-flop circuit having its input connected to the output of said third differentiating circuit and providing one of said driving-pulsed outputs of said gate-timing generator, a second one-shot multivibrator connected to the second differentiating circuit and providing output pulses equal in duration to the pulses from said flip-flop circuit to provide the second driving-pulsed output of said gate-timing generator, a fourth differentiating circuit connected to the output of said second multivibrator, a third one-shot multivibrator connected to the output of said fourth differentiating circuit to provide short duration pulses and being triggered by the trailing edges of the pulses of said third one-shot multivibrator, the output of said third one-shot multivibrator being the sampling-pulsed output of said timing generator, a fifth differentiating circuit connected to the output of said third one-shot multivibrator, a fourth one-shot multivibrator having an input connected to said fifth differentiating circuit and being triggered by the trailing edges of pulses of said third one-shot multivibrator, and an output of said fourth multivibrator providing the quenching-pulsed output of said timing generator.

References Cited in the file of this patent

UNITED STATES PATENTS

| | | |
|---|---|---|
| 2,782,411 | McNaney | Feb. 19, 1957 |
| 2,874,285 | Brown | Feb. 17, 1959 |